June 10, 1952  A. V. GROSSE  2,600,360
SUPPRESSING THE OXIDATION OF CO TO CO$_2$
IN A FIXED BED REGENERATOR
Filed July 22, 1949
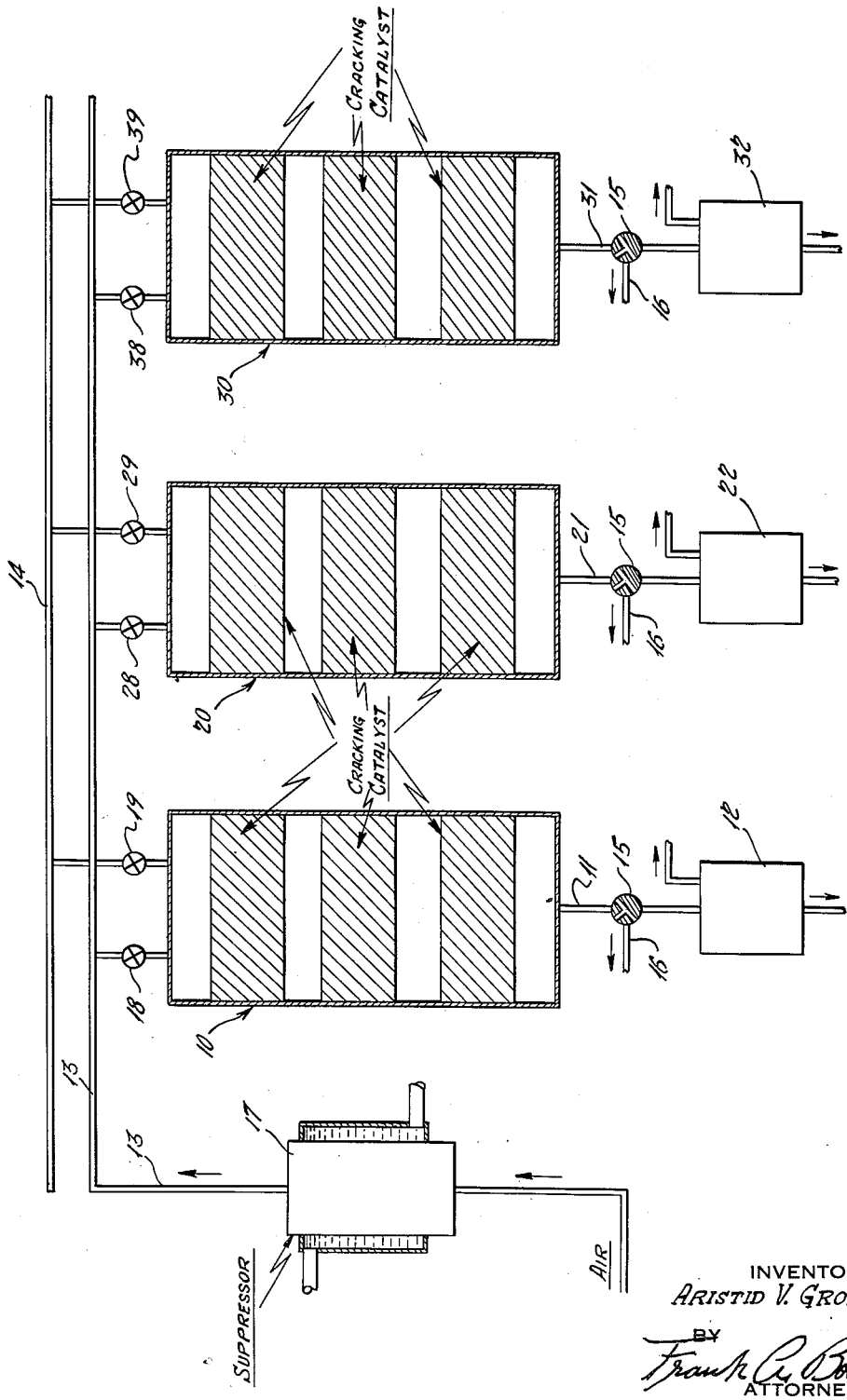
INVENTOR
ARISTID V. GROSSE
BY
Frank A. Bower
ATTORNEY Patented June 10, 1952

2,600,360

UNITED STATES PATENT OFFICE 2,600,360

SUPPRESSING THE OXIDATION OF CO to $CO_2$ IN A FIXED BED REGENERATOR

Aristid V. Grosse, Haverford, Pa.

Application July 22, 1949, Serial No. 106,251

12 Claims. (Cl. 252—416)

This invention relates to the removal of carbon deposit from petroleum cracking catalysts and more particularly to the suppression of combustion in removal of the carbon deposit.

In the processes for catalytic cracking of petroleum used in the oil industry, it is essential to burn off the carbon deposit accumulated on the cracking catalyst. The heat of this combustion is undesirable and injurious to the catalytic material. At the present time this combustion involves the transformation of the carbon into carbon dioxide with release of its attendant heat of combustion.

It is an object of this invention to reduce the heat of combustion accompanying the burning of carbon deposit from petroleum cracking catalysts.

It is another object of this invention, in removing carbon deposit from catalytic material, to change it to carbon monoxide.

It is a further object of this invention to suppress the formation of carbon dioxide in the burning of carbon deposit from cracking catalysts.

These and other objects of this invention will become more apparent upon consideration of the following description, together with the drawing which is a diagrammatic showing of a plant for catalytic cracking.

Referring to the figure, three tanks 10, 20 and 30 are shown in three cracking stages in a fixed bed cracking apparatus. In each of these stages there is a bed of catalytic material made up of horizontal layers. Across and through this catalytic material the oil to be cracked is fed from oil lines 14. Discharge lines 11, 21 and 31 lead from the bottom of each of the stages 10, 20 and 30, respectively. Each of these lines 11, 21 and 31 connects to a receiver 12, 22 and 32. Each of the lines 11, 21 and 31 has a three-position valve 15. The valves 15 control the flow through the lines 11, 21 and 31 so that the tanks 10, 20 and 30 can be connected to receivers 12, 22 and 32, respectively, or the lines 11, 21 and 31 can be connected to discharge nozzles 16 for venting, or the lines 11, 21 and 31 can be completely closed.

The oil to be cracked is fed into the tanks 10, 20 and 30 through oil lines 14 which are valved to provide control over the feeding of the oil. Describing one method of operating a fixed bed cracking apparatus as applied to the system shown in the figure, oil is run into tank 10 and cracked. The products of the cracking are passed into receiver 12. The catalytic material which in one form is porous pellets becomes coked up by carbon deposit from oil vapors. The increasing carbon deposit reduces the catalytic action until the accumulation becomes so great as to render the operation of the stage inefficient. It is necessary to remove the carbon from the catalyst to continue the operation of the cracking operation.

At the present time this carbon is removed by burning the carbon off the catalyst. This is accomplished by closing the oil line into a stage and purging the catalyst with steam, or evacuating the chamber, after which a flow of dry air is passed over the hot catalyst bed. The effect of the air is to oxidize the carbon deposit to substantially carbon dioxide, which is drawn off through a suitable outlet.

The oxidation of carbon to carbon dioxide is accompanied by a large evolution of heat. It is the purpose of this invention to reduce the amount of heat thus evolved by limiting the oxidation of the carbon to carbon monoxide. The reaction of $C+O_2 \rightarrow CO_2$ has a heat of combustion of 94.385 cal./mole as compared with the reaction of $C+\frac{1}{2}O_2 \rightarrow CO$, which has a heat of combustion of 26.428 cal./mole, at 18° C. To thus limit the oxidation of carbon a chemical suppressor is employed.

It has been discovered that the chlorides and bromides of silicon and to a lesser extent of aluminum, titanium and zirconium mixed together with free chlorine or bromine are most effective in suppressing the formation of carbon dioxide in the oxidation of carbon deposit from the catalytic material even in the presence of the cracking catalyst. The employment of this suppressor is shown diagrammatically in the figure. After a tank such as tank 10 has become coked up in the operation of this invention, the valve 19 from the oil line 14 is closed, the valve 15 is set to connect vent 16 to tank 10. The tank 10 is then evacuated. Oxidizing air is fed through a suppressor 17 where it passes through a liquid mixture of a suppressor solution, such as silicon tetrachloride and bromine. The suppressor saturated air is passed through line 13 and into tank 10 through valve 18. The mixture of air and suppressor is heated to approximately the catalyst temperature where the air oxidizes the carbon deposit. This oxidation, however, is limited largely to formation of carbon monoxide which is drawn off through vent 16 with any uncombined air. This process fits into the normal operation of the stages. As is customary in this type of operation, while tank 10 is being oxidized tank 20 in the next stage is being evacuated preparatory to oxidation while in tank 30 cracking is taking place. The steps are repeated stage by stage with cracking taking place in each tank after oxidation removes carbon from the catalyst.

By suppressing the production of carbon dioxide in favor of carbon monoxide the generation of heat in the oxidation of the carbon deposit is reduced. This is shown by the following example which serves to illustrate the process:

An alumina-silica cracking catalyst in small pellets in a Pyrex glass reaction tube was coked by passing vapors of paraffin wax at about 500° C. over the catalyst pellets under usual cracking conditions. An oxidizing gas made up of a suppressor mixture of silicon tetrachloride and bromine gas in the proportion of 5% by volume and oxygen gas was passed over the coked catalyst pellets at an initial catalyst temperature of 540° C. and at a rate of 40 volumes of gas per volume of catalyst per hour. The oxygen gas had an analysis of 94.6% $O_2$, 0.0% $CO_2$, and approximately 5% $N_2$. The volumetric proportions of the suppressor mixture were two-thirds silicon tetrachloride and one-third liquid bromine. A volumetric analysis of the exit gases from the oxidizing decarbonizing reaction showed 3.8% $O_2$, 23% $CO_2$, 69% CO and approximately 4% $N_2$. Under the same conditions, but without a suppressor, the exit gas contained 0.6% $O_2$, 75% $CO_2$, 20% CO and about 5% $N_2$.

The decarbonizing reaction generates 3600 calories per gram of carbon burned. By comparison, an identical oxygen gas without a suppressor mixture decarbonizing identical coked catalyst pellets under identical conditions generated 6700 calories per gram of carbon.

It is thus seen that when oxidizing the carbon deposit in the presence of a suppressor that large amounts of carbon monoxide are formed and comparatively small amounts of carbon dioxide, and the oxidation releases substantially less heat than when a suppressor is absent.

The suppressor acts to combine with and render inactive hydrogen, be it in the free form or as water, in and around the catalytic material. It is a theory of this invention that this hydrogen is undesirable because of its catalytic effect on oxidation of carbon monoxide to carbon dioxide by oxygen. When carbon is burned in the presence of air carbon monoxide is first formed and it is a theory of this invention that as hydrogen acts as a catalyst in the oxidation of carbon monoxide by removing the hydrogen from the vicinity of the carbon oxidation reaction it is possible to limit this oxidation to the formation of monoxide.

One of the advantages of this invention as indicated above is reduction of heat in the removal of carbon deposit by oxidation. The problem of dissipating heat becomes much easier for the design engineer. New design possibilities heretofore considered impractical become available. A further advantage is the production of carbon monoxide in the place of carbon dioxide in the decarbonization of cracking catalysts. The carbon monoxide product can be converted to carbon dioxide in a subsequent operation in a suitable apparatus and the resultant heat recovered.

Thus while I have described my improvement in detail and with respect to certain preferred forms, I do not desire to be limited to such details or forms since, as will be noticed by those skilled in the art, after understanding my invention many changes and modifications may be made and the invention embodied in widely different forms without departing from the spirit and scope thereof in its broader aspects, and I desire to cover all modifications, forms and improvements coming within the scope of any one or more of the appended claims.

Having thus described my invention what I claim as new and desire to secure by Letters Patent is:

1. In a process for decarbonizing a carbonized surface of a petroleum cracking catalyst, the steps comprising preparing an oxidation suppressor by mixing an elemental halogen selected from the group consisting of chlorine and bromine with a chloride of an element selected from the group consisting of silicon, zirconium, titanium and aluminum, mixing said oxidation suppressor with an oxidizing gas, bringing said mixture of said oxidizing gas and oxidation suppressor into contact with said carbonized surface whereby said oxidation suppressor restricts the formation of carbon dioxide in the oxidation of the carbon of said carbonized surface and causes the formation of carbon oxides with carbon monoxide in the greater proportion.

2. In a process for decarbonizing a carbonized cracking catalyst surface as claimed in claim 1, the steps of placing said carbon oxidizing gas in contact with said contaminating carbon at a rate of about 40 volumes of oxidizing gas per volume of catalyst per hour.

3. In a process for decarbonizing a carbonized cracking catalyst surface as claimed in claim 1, oxidizing said carbon to carbon oxides in the proportion of at least 60% carbon monoxide.

4. In a process for decarbonizing a carbonized surface of a petroleum cracking catalyst, the steps comprising preparing an oxidation suppressor by mixing elemental chlorine with a chloride of an element selected from the group consisting of silicon, zirconium, titanium and aluminum, mixing said oxidation suppressor with an oxidizing gas, bringing said mixture of oxidizing gas and oxidation suppressor into contact with said carbonized surface, whereby said oxidation suppressor restricts the formation of carbon dioxide in the oxidation of the carbon of said carbonized surface and causes the formation of carbon oxides with carbon monoxide in the greater proportion.

5. In a process for decarbonizing a carbonized cracking catalyst surface as claimed in claim 4, the steps of placing said carbon oxidizing gas in contact with said contaminating carbon at a rate of about 40 volumes of oxidizing gas per volume of catalyst per hour.

6. In a process for decarbonizing a carbonized cracking catalyst surface as claimed in claim 4, oxidizing said carbon to carbon oxides in the proportion of at least 60% carbon monoxide.

7. In a process for decarbonizing a carbonized surface of a petroleum cracking catalyst, the steps comprising preparing an oxidation suppressor by mixing elemental bromine with a chloride of an element selected from the group consisting of silicon, zirconium, titanium and aluminum, mixing said oxidation suppressor with an oxidizing gas, bringing said mixture of oxidizing gas and oxidation suppressor into contact with said carbonized surface, whereby said oxidation suppressor restricts the formation of carbon dioxide in the oxidation of the carbon of said carbonized surface and causes the formation of carbon oxides with carbon monoxide in the greater proportion.

8. In a process for decarbonizing a carbonized cracking catalyst surface as claimed in claim 7, the steps of placing said carbon oxidizing gas in contact with said contaminating carbon at a rate of about 40 volumes of oxidizing gas per volume of catalyst per hour.

9. In a process for decarbonizing a carbonized cracking catalyst surface as claimed in claim 7, oxidizing said carbon to carbon oxides in the proportion of at least 60% carbon monoxide.

10. In the decarbonization of a carbonized cracking catalyst, the improvement which comprises oxidizing the carbonized cracking catalyst by contact of the carbonized catalyst with a mixture of an oxidizing gas and an oxidation suppressor composition made up of a chloride of an element selected from the group consisting of silicon, zirconium, titanium and aluminum together with a free halogen selected from the group consisting of bromine and chlorine whereby said oxidation suppressor composition restricts the formation of carbon dioxide in the oxidation of the carbon of said carbonized catalyst.

11. In the decarbonization of a carbonized cracking catalyst, the improvement which comprises oxidizing the carbonized cracking catalyst by contact of the carbonized catalyst with a mixture of an oxidizing gas and an oxidation suppressor composition made up of a chloride of an element selected from the group consisting of silicon, zirconium, titanium and aluminum together with a free chlorine whereby said oxidation suppressor composition restricts the formation of carbon dioxide in the oxidation of the carbon of said carbonized catalyst.

12. In the decarbonization of a carbonized cracking catalyst, the improvement which comprises oxidizing the carbonized cracking catalyst by contact of the carbonized catalyst with a mixture of an oxidizing gas and an oxidation suppressor composition made up of a chloride of an element selected from the group consisting of silicon, zirconium, titanium and aluminum together with a free bromine whereby said oxidation suppressor compositon restricts the formation of carbon dioxide in the oxidation of the carbon of said carbonized catalyst.

ARISTID V. GROSSE.

REFERENCES CITED

The following references are of record in the file of this patent:

UNITED STATES PATENTS

| Number | Name | Date |
|---|---|---|
| 1,678,627 | Jaeger | July 24, 1928 |
| 2,396,157 | Claussen | Mar. 5, 1946 |
| 2,423,845 | Myers | July 15, 1947 |